UNITED STATES PATENT OFFICE.

FELIX RICHTER, OF FRANKFORT-ON-THE-MAIN, GERMANY.

PROCESS OF DRAINING AND UTILIZING SLIME.

1,064,773.

Specification of Letters Patent. Patented June 17, 1913.

No Drawing. Application filed November 23, 1910. Serial No. 593,954.

*To all whom it may concern:*

Be it known that I, FELIX RICHTER, a citizen of the German Empire, residing at Frankfort-on-the-Main, Germany, have invented certain new and useful Improvements in Processes of Draining and Utilizing Slime, of which the following is a specification.

My invention relates to a process of dewatering and utilizing slime, such as the deposit from sewage of towns and factories, and consists in the treatment of the slime by intermixing it with finely-divided active carbon (to be later described) and then aerating it by some oxygen-containing gas. The result of this treatment is that the slime readily gives off the contained water, so that, after such water has been removed by pressing or in any other manner, there remains a slime material with a very small proportion of water. This material can be pressed directly into cakes of any desired shape without previous drying, and the cakes can be used as fuel, or, after having been reduced to powder, as a fertilizer.

By "active carbon" I mean a carbon adapted to condense gases on the surface of its particles, preferably the carbonaceous residue obtained by the dry distillation, with exclusion of air, of a carbon-containing material, such as brown coal, mixed with finely-divided mineral substances, such as clay or ashes. The dry slime produced by the present process can itself be advantageously used as a suitable carbon-containing material. The finely-divided active carbon produced in this manner has the property of condensing on the surface of its particles the air or oxygen-containing gases introduced into the mixture, thereby enabling a strong oxidation of the impurities in the slime-mixture to be effected; and moreover has the property of mechanically attracting and holding the oxidized impurities in the slime.

In carrying out the invention, 20 to 40 kg. of active carbon can be used for 1000 kg. of slime with about 90 per cent. of water. The active carbon may be thoroughly intermixed with the slime by blowing finely-divided air into the mass. The addition of the finely-divided active material results partly in the colloids and other suspended substances in the slime being held fast and concentrated by the active material, owing to the surface attraction; and also in the decomposition of the colloids by oxidation due to the aeration in presence of the active carbon material, so that the water is released and can escape and a slime product is obtained which is no longer liable to putrefaction. The water which does not flow away automatically can be separated, down to a small percentage, by means of any well known separating device (such as a press, centrifugal machine or the like), so that practically a completely dry material is produced. The said material can then be pressed at once into cakes of a given shape and reduced for the purpose of using it as fertilizer, or subjected to a dry distillation, for the purpose of using it for the draining of further quantities of slime.

The dewatering of slime in accordance with the process above described can be facilitated by adding any well known coagulant, such as caustic alkali, sulfate of aluminum, chlorid of lime and the like.

What I claim is:

1. The process of dewatering slime, which comprises mixing the slime with the finely-divided residue of the heat treatment of carbon-containing material, and then subjecting the mixture to the action of an oxygen-containing gas.

2. The process of dewatering slime, which comprises mixing the slime with the finely-divided residue of the dry distillation of carbon-containing material, and then subjecting the mixture to the action of an oxygen-containing gas.

3. The process of dewatering slime, which comprises mixing the slime with the finely-divided residue of the dry distillation of a mixture of finely-divided carbon-containing material and mineral matter, and then subjecting the mixture to the action of an oxygen-containing gas.

4. The process of treating slime, which comprises treating the slime with the finely-divided residue of the heat-treatment of carbon-containing materials, subjecting the mixture to the action of an oxygen-containing gas, and then pressing the residue, without previous drying, into solid pieces.

5. The process of treating slime, which comprises mixing the slime with a residue of the dry distillation of carbon-containing material, subjecting the mixture to the action of an oxygen-containing gas, and then subjecting the mixture to pressure, without previous drying, to form it into solid pieces.

6. The process of treating slime, which comprises mixing the same with the finely-divided residue of the heat-treatment of carbon-containing materials, aerating the mixture, pressing into solid pieces, without previous drying, and then reducing such pieces to powder.

In testimony whereof, I affix my signature in presence of two witnesses.

FELIX RICHTER.

Witnesses:
 JEAN GRUND,
 CARL GRUND.

Copies of this patent may be obtained for five cents each, by addressing the "Commissioner of Patents, Washington, D. C."